(No Model.)

T. W. B. KIRKPATRICK.
MILK COOLER.

No. 373,462. Patented Nov. 22, 1887.

Witnesses:
J. C. Tate.
R. H. Orwig.

Inventor:
Thomas W. B. Kirkpatrick,
By Thomas G. Orwig, Atty.

UNITED STATES PATENT OFFICE.

THOMAS W. B. KIRKPATRICK, OF OTTUMWA, IOWA.

MILK-COOLER.

SPECIFICATION forming part of Letters Patent No. 373,462, dated November 22, 1887.

Application filed June 9, 1887. Serial No. 240,825. (No model.)

*To all whom it may concern:*

Be it known that I, THOMAS W. B. KIRKPATRICK, a citizen of the United States of America, and a resident of Ottumwa, in the county of Wapello and State of Iowa, have invented a Milk-Cooler, of which the following is a specification.

My object is to provide a simple, cheap, durable, and convenient device for cooling all kinds of liquids, but especially adapted to facilitate the extraction of the latent heat and animal odors from fresh warm milk, as required to hasten the formation, increase the quantity, and improve the quality of cream and butter.

My invention consists in the construction and combination of a refrigerator, a liquid-conveyer, and an air-conductor, as hereinafter set forth, pointed out in my claim, and illustrated in the accompanying drawings, in which—

Figure 2:
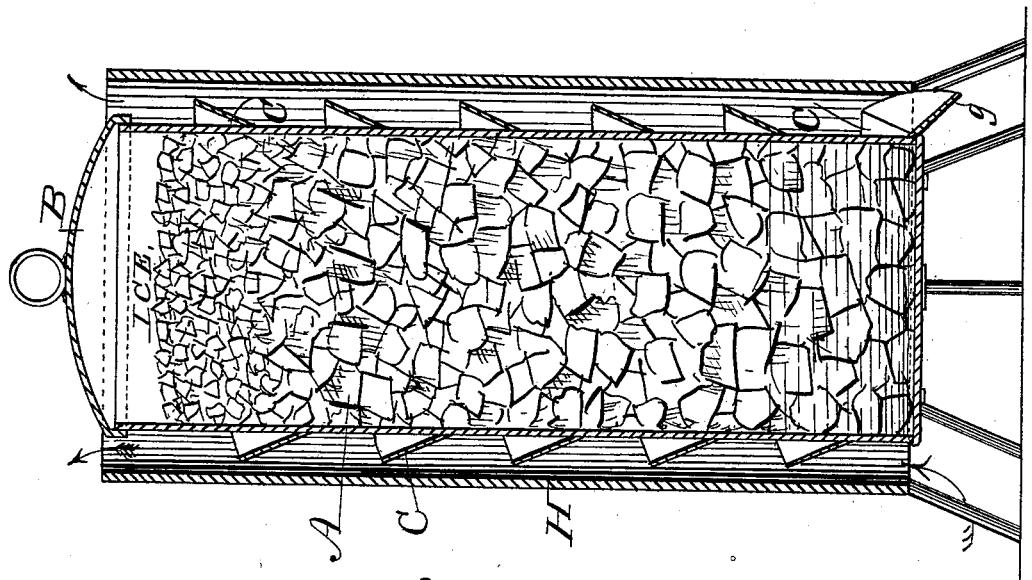
Figure 1:
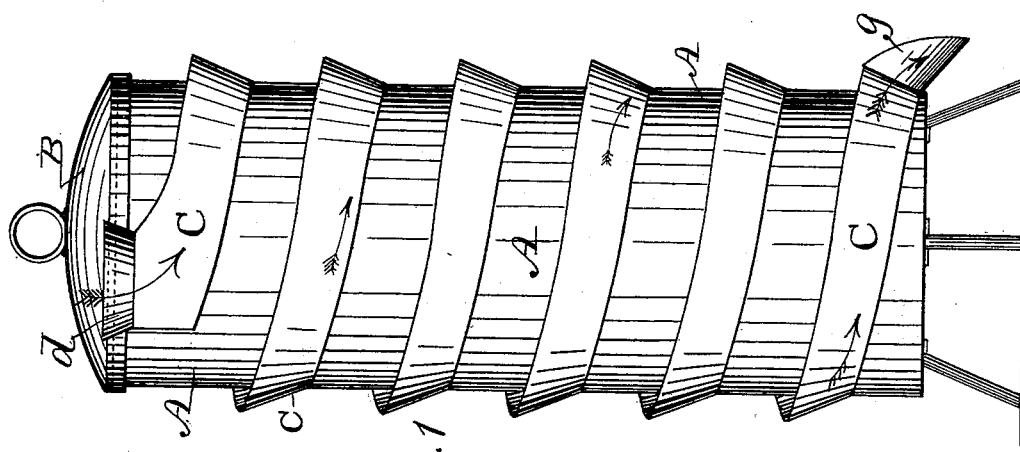

Figure 1 is a side view showing the refrigerator and liquid-conveyer combined, and Fig. 2 a vertical half-section of the complete device.

A represents the refrigerator in the form of a cylindrical vessel that has a water-tight bottom and an open top.

B is a removable cover fitted on the top. It is preferably made of tin or other suitable sheet metal, and may vary in size as desired. Feet are attached to its bottom to support it in an elevated and perpendicular position when in use.

C is a conveyer in the form of a sheet-metal band, fixed to the outside of the refrigerator or vessel A in such a manner that it will be a spiral gutter extending from the top to the bottom.

d represents a flaring lip or funnel at the top of the gutter, that facilitates pouring milk or other fluids into the top of the conveyer.

g represents a discharge-spout at the bottom of the conveyer, to facilitate the discharge of liquid into a milk-pan or other suitable vessel.

H represents my air-conductor, in the form of an open-ended cylinder or jacket that is large enough in diameter to slip over the refrigerator and liquid-conveyer without coming in contact therewith, so that air can enter below and pass up and out at the top at the same time milk or other liquid is descending in the liquid-conveyer, to be cooled by its contact with the cold wall of the refrigerator, that is filled with ice. The heat and odor in the milk is thus readily and expeditiously extracted by simply passing the milk through the liquid-conveyer one or more times.

The air-conductor H may be provided with feet, as shown in Fig. 2, or otherwise retained in proper position around the refrigerator and liquid-conveyer.

I am aware that a vessel for retaining water has had two concentric vessels or cylinders inclosed therein in such a manner that ice could be placed in the inner vessel and water in the outer vessel, a spiral flange extended from top to bottom between the outside of the inner vessel or cylinder and the inside of the intermediate cylinder in such a manner that liquid could be conducted, by means of tubing, to pass around the inner vessel upon the spiral flange and become cooled in its passage; but my manner of constructing a gutter around a refrigerating-vessel, so that it will receive and convey liquid independently of any surrounding vessel, and combining an open-bottomed jacket and air-conductor therewith, is novel and advantageous.

I claim as my invention—

A liquid-cooler comprising a refrigerating-vessel open at the top and closed at the bottom, a gutter and open-topped spiral conveyer fixed to and surrounding the outside surface of the vessel, and an air-conveyer or jacket surrounding the vessel and conveyer and having an open top and an open bottom, all combined and operating as and for the purpose set forth.

THOMAS W. B. KIRKPATRICK.

Witnesses:
D. DIERKS,
M. A. ROBERTS.